US009824522B2

(12) United States Patent
Smith et al.

(10) Patent No.: US 9,824,522 B2
(45) Date of Patent: Nov. 21, 2017

(54) SHARED VIDEO VENDOR

(71) Applicant: Cubic Corporation, San Diego, CA (US)

(72) Inventors: Gavin R. Smith, Crawley (GB); Jon Packham, Ashford (GB); Steffen Reymann, Reigate (GB)

(73) Assignee: Cubic Corporation, San Diego, CA (US)

( * ) Notice: Subject to any disclaimer, the term of this patent is extended or adjusted under 35 U.S.C. 154(b) by 84 days.

(21) Appl. No.: 14/326,932

(22) Filed: Jul. 9, 2014

(65) Prior Publication Data

US 2015/0019010 A1 Jan. 15, 2015

Related U.S. Application Data

(60) Provisional application No. 61/844,729, filed on Jul. 10, 2013.

(51) Int. Cl.
*G07F 11/00* (2006.01)
*G07F 17/42* (2006.01)
(Continued)

(52) U.S. Cl.
CPC .......... *G07F 11/002* (2013.01); *G06Q 10/02* (2013.01); *G06Q 20/18* (2013.01);
(Continued)

(58) Field of Classification Search
CPC ........ G07F 17/26; G06Q 10/02; G06Q 20/18; G06Q 30/0269
See application file for complete search history.

(56) References Cited

U.S. PATENT DOCUMENTS 5,091,713 A * 2/1992 Horne ........................ G07F 5/18 700/237
5,929,897 A * 7/1999 Schneider ............... H04M 3/51 348/14.01

(Continued)

FOREIGN PATENT DOCUMENTS

WO 9928830 A1 6/1999

OTHER PUBLICATIONS

International Search Report and Written Opinion of PCT/US2014/046119 dated Oct. 20, 2014, 140 pages.

*Primary Examiner* — Timothy Waggoner
(74) *Attorney, Agent, or Firm* — Kilpatrick Townsend and Stockton, LLP

(57) ABSTRACT

Embodiments of the invention provide a vending machine for enabling a transaction between a user and one of a plurality of remote sources. Vending machine may include a communication interface communicatively coupled with each source. Vending machine may include an input interface for receiving an input regarding the selection of a source. Vending machine may include a speaker and a microphone for audio communication with selected source, as well as a display for providing information related to the transaction from selected source. Vending machine may include a processor that transmits an indication that a source has been selected and establishes, via the communication interface, audio communication. Processor may receive, via the communication interface, a control command from selected source directing a hardware peripheral of vending machine to perform a function. Processor may receive an issuance authorization from selected source. The issuance authorization may cause a transaction item to be issued.

20 Claims, 6 Drawing Sheets

(51) Int. Cl.

| | |
|---|---|
| ***G06Q 20/18*** | (2012.01) |
| ***G06Q 10/02*** | (2012.01) |
| ***G06Q 30/02*** | (2012.01) |
| ***G06Q 50/10*** | (2012.01) |

(52) U.S. Cl.
CPC ......... *G06Q 30/0269* (2013.01); *G06Q 50/10* (2013.01); *G07F 17/42* (2013.01)

(56) References Cited

U.S. PATENT DOCUMENTS

| | | | | |
|---|---|---|---|---|
| 6,308,887 | B1 * | 10/2001 | Korman | G06Q 20/18 902/4 |
| 6,658,568 | B1 * | 12/2003 | Ginter | G06F 21/00 348/E5.006 |
| 7,571,850 | B2 * | 8/2009 | Barcelou | G06Q 20/102 235/379 |
| 7,857,207 | B1 * | 12/2010 | Hopkins, III | G07F 19/20 235/381 |
| RE43,656 | E * | 9/2012 | Satchell, Jr. | G07F 9/006 705/17 |
| 9,361,610 | B2 * | 6/2016 | Matotek | G06Q 20/20 |
| 2006/0004660 | A1 | 1/2006 | Pranger | |
| 2006/0180653 | A1 | 8/2006 | Meek et al. | |
| 2012/0265679 | A1 | 10/2012 | Calman et al. | |

* cited by examiner

SHARED VIDEO VENDOR

CROSS-REFERENCES TO RELATED APPLICATIONS

This nonprovisional application claims priority from U.S. Provisional Application No. 61/844,729, filed on Jul. 10, 2013, the complete disclosure of which is herein incorporated by reference.

BACKGROUND OF THE INVENTION

Vending machines provide simple systems for conducting transactions to provide consumers with products and services. Such vending machines typically dispense tickets, such as transit tickets, to users at convenient locations. While such vending machines prove to be convenient to users, the vending machines can often be expensive for a product or service provider to operate and maintain. Additionally, as ticket vending machines become more prominent and advanced, users must learn many new complex interfaces, which can be difficult and prompt users to find alternative transaction sources. Embodiments of the invention may provide solutions to these and other problems.

BRIEF SUMMARY OF THE INVENTION

Techniques are disclosed herein for providing a shared video vender (SVV) or vending machine that enables transactions with a number of remote sources. Embodiments may allow for audio and/or video communication between a user of the vending machine and a representative of one of the remote sources. Embodiments also enable a user to select and pay for a transaction conducted with the remote source. Embodiments may also keep records of each transaction conducted at a vending machine that may be checked against records of each remote source to detect discrepancies, such as those that indicate fraudulent activity.

In one embodiment, a vending machine for enabling a transaction between a user and one of a plurality of remote sources is provided. The vending machine may include a communication interface communicatively coupled with each of the plurality of remote sources. The vending machine may include an input interface for receiving an input regarding the selection of one of the plurality of remote sources. In some embodiments, the vending machine may include a speaker and a microphone, where the speaker and the microphone are configured to enable an audio communication with the selected remote source. The vending machine may also include a display for providing information from the selected remote source. The information may be related to the transaction with the selected remote source. The vending machine may also include a processor that is configured to transmit an indication that one of the plurality of remote sources has been selected. The processor may also be configured to establish, via the communication interface, the audio communication with the selected remote source. In some embodiments, the processor may be configured to receive, via the communication interface, a control command from the selected remote source that directs a hardware peripheral of the vending machine to perform a function. The processor may also be configured to receive an issuance authorization from the selected remote source. The issuance authorization may cause a transaction item to be issued.

In another embodiment, a method for enabling a transaction between a user and one of a plurality of remote sources using a vending machine is provided. The method may include receiving a user input, via an input interface, to select one of a plurality of remote sources. Each of the plurality of remote sources may be communicatively coupled with the vending machine via a communication interface. The method may also include transmitting an indication that one of the plurality of remote sources has been selected. The method may further include establishing, via the communication interface, an audio communication with the selected remote source. The method may include receiving information from the selected source. The information may be related to the transaction with the selected remote source. The method may also include causing the information to be presented on a display of the vending machine. The method may optionally include receiving, via the communication interface, a control command from the selected remote source that directs a hardware peripheral of the vending machine to perform a function. The method may further include receiving an issuance authorization from the selected remote source. The issuance authorization may cause a transaction item to be issued.

In another embodiment, a computer program embodied on a computer readable medium is provided. The computer program may include instructions executable by a computer to receive a user input, via an input interface, to select one of a plurality of remote sources. Each of the plurality of remote sources may be communicatively coupled with the vending machine via a communication interface. The computer program may also include instructions executable by a computer to transmit an indication that one of the plurality of remote sources has been selected and to establish, via the communication interface, an audio communication with the selected remote source. The computer program may further include instructions executable by a computer to receive information from the selected source. The information may be related to the transaction with the selected remote source. The computer program may optionally include instructions executable by a computer to cause the information to be presented on a display of the vending machine. The computer program may include instructions executable by a computer to receive, via the communication interface, a control command from the selected remote source that directs a hardware peripheral of the vending machine to perform a function. The computer program may also include instructions executable by a computer to receive an issuance authorization from the selected remote source. The issuance authorization may cause a transaction item to be issued.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
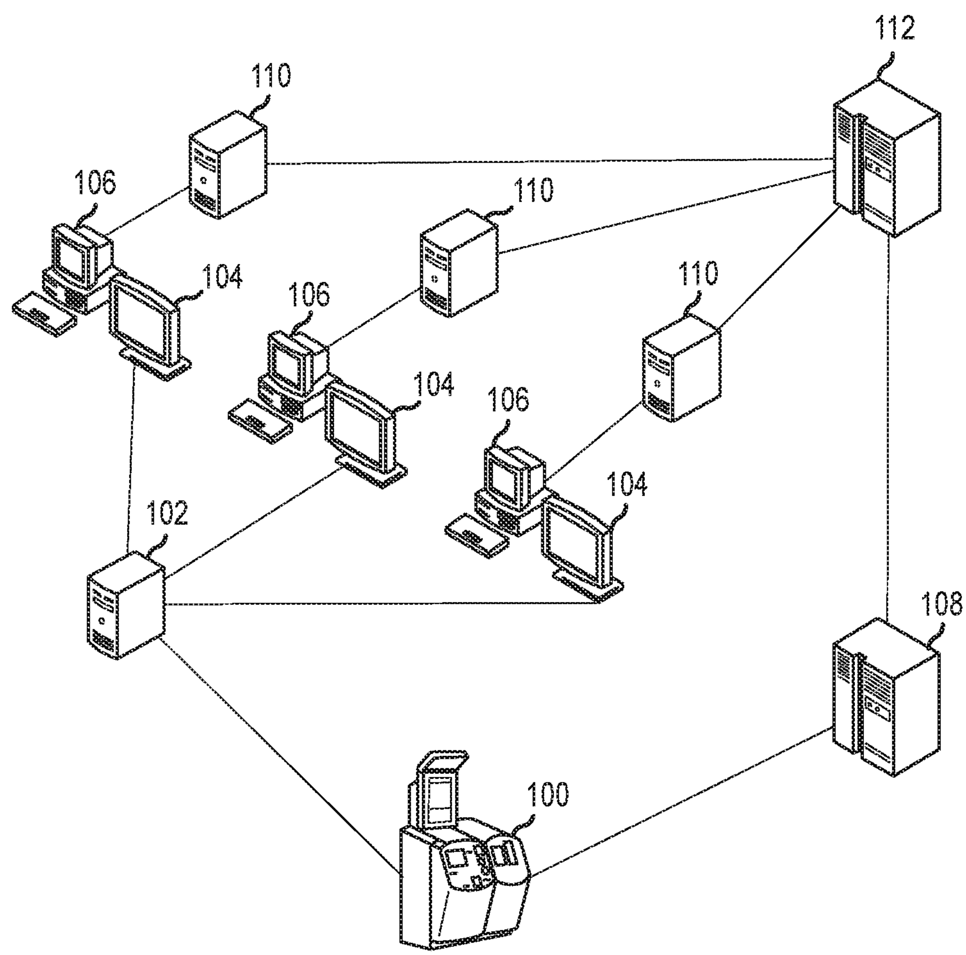
FIG. 1 is a system diagram of a system for enabling transactions between a vending machine and multiple remote sources, according to one embodiment.

For the purposes of explanation, the ensuing description provides specific details are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

Embodiments of the present invention may allow multiple independent retailers to share a single video-enabled vending machine, each selling their own products using their own point of sale systems in their own video call center. The vending machines may also be used to conduct non-purchase transactions, such as returns, exchanges, and transfers for tickets.

Conventional vending machines are traditionally run by a single retailer. A Shared Video Vendor (SVV) (also referred to herein as a "NextAgent," "Video Ticket Office" (VTO), "shared VTO", and "vending machine"), may serve multiple independent remote sources, each accessing the device's customer interface via secure software libraries. One or more software libraries with secure, easy to use interfaces can be provided for the 3$^{rd}$ party retail systems to allow them to control the SVV. For example, call centers and Point of Sale (POS) systems of remote sources may control the SVV. A single physical vending machine may be connected to several different remote sources' systems, each of which may take control of the SVV's hardware to conduct transactions, accept payment and/or issue their own specific products and/or services. Multiple retailers who would have to staff shops in a public place can now share a single SVV and significantly reduce the overhead costs of retailing. The SVV may keep its own record of all transactions in and out and pass this transaction data to a reconciliation service that can ensure all sales claims from the different systems and sources are validated and revenue collected from the SVV is allocated accordingly.

In some embodiments, the SVV supplier/maintenance provider may charge each retailer for each customer call serviced, regardless of whether a product and/or a service was sold, plus a small commission on every sale. The service provided by the SVV supplier/maintenance provider may include high availability of the device, installation, and maintenance of interface systems in the call centers, the hosting and management of the SVV control service and the revenue reconciliation service.

In one embodiment, a vending machine for enabling a transaction between a user and one of a number of remote sources is provided. Remote sources include retailers and/or service providers that are contacted via audio and/or video communication through the vending machine. Typically, one or more points of sale of one or more of the remote sources are physically positioned in a different location that the vending machine. In some embodiments, a remote source may be represented by a call center that communicates with the vending machine. The call center and/or the remote source may have agents or representatives that assist users of the vending machine in completing transactions.

The vending machine may include a control service or communication interface communicatively coupled with each of the plurality of remote sources. The remote sources may be any provider of a good or service. For example, remote sources may include hotels, airline services, mass transit providers such as bus and train systems, entertainment providers, such as sporting events, movies, concerts, other shows, and the like. A vending machine may be linked to any number of remote sources. By increasing the number of sources available to select from at a single vending machine, the cost of operation and maintenance of the vending machine is reduced to each source. The provision of multiple sources also increases the amount of convenience provided to users of the vending machine. Additionally, by increasing the number of remote sources accessible using a vending machine, fewer different vending machines and vending machine interfaces are necessary. This allows users to learn how to operate fewer machines, increasing the likelihood that a user will be comfortable enough to use the vending machine.

Each source may have software available that allows the source to control the vending machine. For example, the control service may include an application programming interface (API) to enable systems of the remote sources to communicate with and control the vending machine. For example, point of sale (POS) systems of the remote sources may communicate with the control service. In some embodiments, each source includes an interface system that serves to connect the POS system and the control service. Embodiments of the control service may include telephone connections for audio communication, network connections that enable voice over internet protocol (VOIP), networks for instant messaging, and/or a network configured to establish a video communication, and the like. In some embodiments, this communication is established by a call management service. In some embodiments, more than one connection may be included in the control service. By including multiple connection types, multiple forms of communication may be provided between the remote sources, systems of the remote sources, and the vending machine. This additionally allows each remote source to select its own preferred types of communication.

The control service may be further configured to enable of system of the selected source to control one or more of the hardware peripherals of the vending machine, such as a display, a printer, a payment reader, an input interface, a microphone, a speaker, or a camera. Control over such devices may be done automatically by the POS system and/or interface system of the remote source in response to an event of the transaction. Control of the vending machine may be maintained by a representative of the selected source. For example, the representative may control when and/or what information is provided on the display of the vending machine. In some embodiments, a representative may provide this information based on the audio and/or video communication. As another example, a printer on the vending machine may be commanded to print a receipt and/or a transaction item of the transaction upon termination of the audio communication.

In some embodiments, the control service may be provided in the vending machine itself. In such embodiments, the selected source controls the vending machine using a virtual network computing (VNC) connection. In other embodiments, the communication interface may be on a separate server that is in communication with the vending machine over a secure network.

The vending machine may include an input interface for receiving an input regarding the selection of a remote source. The input interface may include any mechanism that allows a user to select one of the remote sources. The selection of a source may be direct, such as by a user pushing a button assigned to a particular remote source, or the user may interact with the input interface to initiate a communication with a general representative that may direct the communication to a particular remote source. For example, a user may press a "start" button that initiates a call with an operator who may then connect the vending machine with a selected source as indicated by the user. In some embodiments, the input interface may include a keypad, touchscreen of a display of the vending machine, a speech recognition device, and/or any other input device. Some vending machines may include multiple input interfaces, such as by including both a touchscreen and a keypad.

In some embodiments, the vending machine may include a speaker and a microphone that are configured to enable an audio communication with the selected remote source. The audio communication enables a user to speak to a representative of the selected remote source such that the representative may assist the user in completing a transaction. For example, the representative may explain the products and/or services available to the user and may answer any questions the user may have so the user may make a fully informed purchase decision.

The vending machine may also include a display for providing information from the selected remote source. Upon selecting a remote source, a user may be presented with information related to the transaction with the selected remote source. For example, the information may include pricing options, time and/or date options, product and/or seating availability, or any other information that may aid a user in completing the transaction. In some embodiments, the information may be provided by a representative of the selected source based on the audio and/or video communication. The display may also provide a user with information on available sources, products, and/or services prior to selection of a remote source. The display may also include a touchscreen that is used as the input interface.

The vending machine may also include a processor that is configured to transmit an indication that one of the plurality of remote sources has been selected. For example, the indication may include a signal transmitted to a system of the selected remote source, such as a point of sale (POS) system. In one embodiment, the indication may include the dialing of a phone number assigned to the selected source. In such embodiments, the audio communication may be established immediately via the control service and/or the call management service.

The processor may also be configured to establish, via the control service and/or the call management service, the audio communication with the selected remote source. The audio communication may be a phone call to a number designated by the selected remote source established using the communication interface. For example, the selected remote source may designate a telephone number that directs a user to a call center that services the remote source. The selected remote source may also designate a telephone number for a direct line to the product and/or service provider. In some embodiments, the audio connection may be conducted using a VOIP connection. The audio connection allows a user of the vending machine to discuss the transaction with an agent or representative of the selected source.

In some embodiments the control service handles both the remote access to the vending machine and provides the connection for audio and/or video communication with the vending machine. In other embodiments, the control service only controls the remote access, while a separate call management service provides the connection for the audio and/or video communication. In some embodiments, once a communication with the selected remote source is initiated, the call management service may provide an indication to the control service regarding the selection such that remote access of the vending machine may be granted to the selected source using the control service. An instance of the control service software may then control the remotely located vending machine.

In some embodiments, the processor may be configured to receive, via the control service, a control command from the selected remote source that directs a hardware peripheral of the vending machine to perform a function. Upon transmission of the indication of the selection of the remote source, the selected remote source may be provided remote access to the vending machine through the control service. The remote access may be provided by a virtual machine on a remote server or may be provided by software running directly on the vending machine. Oftentimes, the control service will enable a system or agent from the selected remote source to control the hardware features of the vending machine to assist a user of the vending machine in completing a transaction.

The processor may also be configured to receive an issuance authorization from the selected remote source. The issuance authorization may cause a transaction item to be issued. For example, the selected source may transmit an authorization message that a user has selected a particular good or service and that any necessary payment has been authorized and collected. Upon receipt of such an issuance authorization, the vending machine may issue a transaction item. Transaction items may include, for example, tickets, boarding passes, transit passes, hotel confirmations, tokens or vouchers for redemption for products and/or services, other confirmations, and the like. In some embodiments, the transaction item may be in the form of a printed ticket or receipt. In other embodiments, the transaction item may be issued by sending an email confirmation, sending an electronic ticket, and/or storing a file associated with an application on a mobile device, such as a smartphone or a smartcard.

As shown in FIG. 1, vending machine 100 can be communicatively coupled with a communication interface or control service 102. Connections shown in FIGS. 1-2 can be made through private and/or public networks (e.g., the Internet), for example. In some embodiments, control service 102 may be integrated into vending machine 100. The control service 102 is in communication with multiple remote sources using interface systems 104. Interface systems 104 may be on servers of the remote sources. Each of the interface systems 104 connected to the control service 102 may be connected to a system of the remote source, such as POS system 106. The connections between the control service 102 and the vending machine 100 and each of the interface systems 104 may be secure. This may be done using encryption over a public network, a private network, a secure virtual private network (VPN), or any other method of securing a connection. The POS systems 106 may each be affiliated directly with a corresponding interface system 104 or may be connected to the corresponding interface system 104 over a network. POS systems 106 that connect to the interface systems 104 over a network may need to be authenticated prior to communication being enabled, to ensure the connection remains secure and accessible only to approved remote source systems.

The control service 102 may control the physical components of the vending machine. Each of the remote sources may control these physical components using the connection between the control service 102 and interface system 104. The control service 102 may relay information from the interface system 104 of a selected source to the vending machine 100 in embodiments where the control service 102 is provided on a remote server. The control service 102 only maintains an open connection with the vending machine 100 and the interface systems 104. This ensures that only the remote sources having the interface systems 104 can control the hardware of the vending machine 100, thus adding a layer of security to the shared vending machine system. In this manner, a selected remote source may have complete control over the vending machine 100 during a transaction via the control service 102.

The transaction system may also include a back office 108 coupled with the vending machine 100. The back office 108 may gather information from the vending machine 100 related to transactions completed at the vending machine. For example, information related to issuing transaction items, the printing of tickets and/or receipts, the receipt of payment, and any other information related to a transaction may be gathered by back office 108. The transaction information may be stored to provide a record of all transactions conducted at a vending machine. Multiple remote sources have access to the vending machine 100, and each remote source may have a large number of representatives who have access to the vending machine 100 through the control service 102. The record helps track the large volume of transactions from various sources and may be useful in detecting fraudulent behavior. While shown here as a separate device or server, the function of the back office 108 may be integrated into the functionality of the control service 102. By having the back office 108 as a separate device or server, an extra layer of security may be maintained. As used herein, the term "back office" is used to describe any back-end system. Moreover, a person of ordinary skill in the art will recognize that one or more of a variety of computing systems may be used in addition to or as an alternative to the back offices and/or other computing components described herein.

Each of the remote sources may also include a source back office 110. Each source back office 110 functions in a similar manner as back office 108, but gathers only information related to transactions completed using one or more vending machines with that particular source. This enables each source to maintain records of their own transactions. The records may be created by the source's own POS system 106. There may also be a reconciliation service 112 that may be in communication with both the back office 108 and the source back offices 110. The reconciliation service 112 may collect data from each of the source back offices 110 as well as the back office 108. The reconciliation service 112 may compare the information from the back office 108 with the information from each of the source back offices to detect any discrepancies in the data. This allows the sources and/or vending machine operators to be alerted so that an investigation can be made to determine the cause of the discrepancy, such as fraudulent activity. In some embodiments, each POS system 106 may transmit transaction records to a source back office 110 for storage of the records. In some embodiments, the POS systems 106 transmit the transaction data to the reconciliation service, while in other embodiments, this transmission is done using the source back offices 110.

In some embodiments, the vending machine 100 may be operated by a separate entity than the remote sources. For example, an airport may own and operate a vending machine that enables transactions with transit, airline, and entertainment providers. In such a situation, payments may be collected by the vending machine operator rather than by the individual sources. Vending machines that are set up to receive cash payments may also have the operator collect the funds. In such embodiments, the reconciliation service 112 may also reconcile and determine how collected payments are to be distributed to the remote sources. In other embodiments, the payments may be made directly to the remote sources and the reconciliation service 112 may not include this functionality.

In some embodiments, the vending machine 100 is configured to receive a payment. Some forms of payment, such as credit cards, require authorization from a financial institution. The processor of the vending machine 100 may communicate a payment authorization request associated with a payment received at the vending machine. The payment authorization request may be sent to a financial institution, such as a bank that issued the credit card used to pay for the transaction. An authorization approval related to the payment authorization may be received from the financial institution that indicates that the payment has been accepted. The processor may then send an indication that the payment has been accepted to the selected source. In situations where the payment authorization request has been denied, the selected source may provide a prompt to provide an alternative form of payment and/or to cancel the transaction. In some embodiments, an indication of acceptance or denial may be provided on the display of the vending machine.

Figure 2:
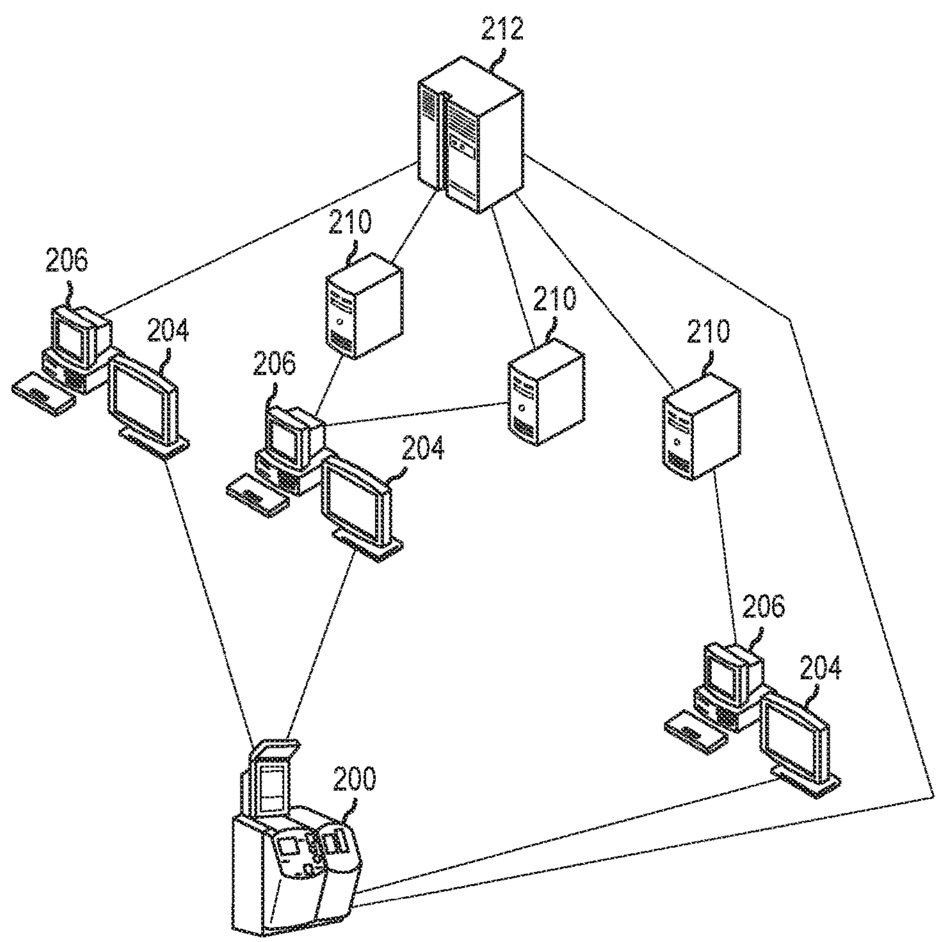
FIG. 2 is a system diagram of a system for enabling transactions between a vending machine and multiple remote sources, according to another embodiment.

FIG. 2 illustrates another embodiment of a system for enabling transactions with multiple remote sources of goods and/or services. Here, a vending machine 200 includes the functionality of the control service as described above. Vending machine communicates directly with multiple interface systems 204 of remote sources, allowing representatives of the remote sources to communicate with, and control the functionality of, the vending machine 200. Each interface system 204 may be communicatively coupled with a POS system 206 of the remote source. In some embodiments, a single interface system 204 and/or POS system 206 may be shared by more than one remote source. For example, a rail transit provider and a hotel booking agency may share a single call center to process transactions. The rail transit provider and hotel booking agency may have a common interface system 204 and/or POS system 206 such that representatives of the remote sources may access all relevant information related to possible transactions at a single source. In such cases, records from the transactions may be then transmitted to and stored within a designated source back office 210 for each of the remote sources. The records from the transactions are sent to a reconciliation service 212. In other embodiments, a remote source may not include a source back office 210. In such cases, the transaction records may be transmitted directly to the reconciliation service 212 from the POS system 206 and/or interface system 204. Vending machine 200 may transmit transaction records directly to reconciliation service 112, which can then compare the vending machine records to the remote source records to identify any discrepancies and/or to determine a proper distribution of collected payments.

Figure 3:
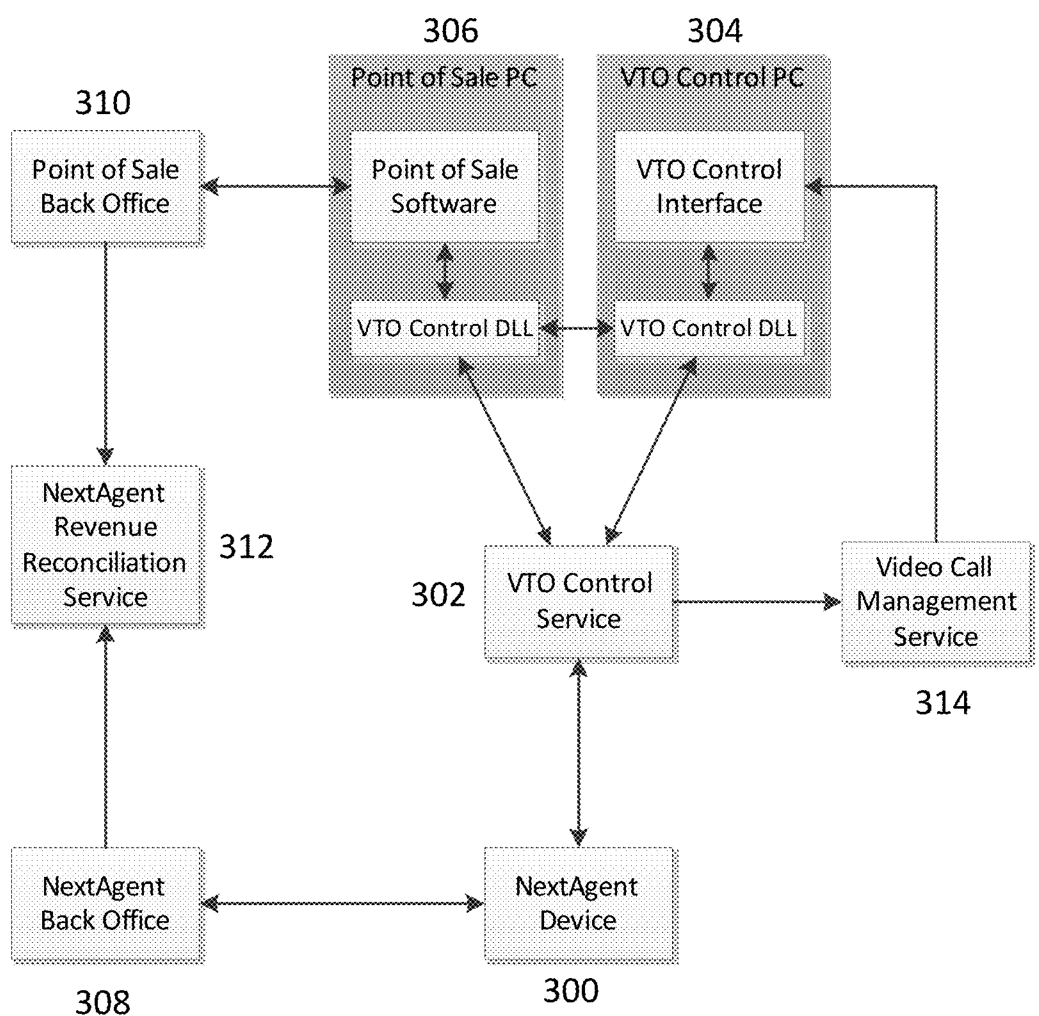
FIG. 3 is a software architecture diagram of a system for enabling transactions between a vending machine and multiple remote sources, according to one embodiment.

FIG. 3 depicts a schematic of software architecture of a system for enabling transactions with a number of remote sources at a single vending machine. A vending machine 300 may communicate with remote sources using communication interface or control service 302. Control service 302 may be run on a separate server or may be integrated into the vending machine 300. After a remote source is selected, an indication of the selection is sent to the selected source using the control service 302 and an audio and/or video communication is established using a call management service 314. In some embodiments, the indication may be sent and the communication established concurrently. In some embodiments, the control service 302 is capable of establishing the communication without using a call management service. When the communication is established, the selected source may communicate with vending machine 300 using an interface system 304 and/or a POS system 306. Communication with the vending machine 300 may include conducting audio and/or video communication and/or controlling the hardware peripherals of the vending machine 300. Hardware control may include instructing the vending machine 300 to display information related to the transaction, issue and/or print a transaction item and/or receipt, read a payment medium, and/or operate other features of the vending machine 300. Upon completion of the transaction the vending machine 300 may transmit a record of the transaction to a back office 308. The POS system 306 may also transmit a record of the transaction to a source back office 310. The source back offices 310 and back office 308 may send the transaction records to a reconciliation service 312 where the records may be compared.

Figure 4:
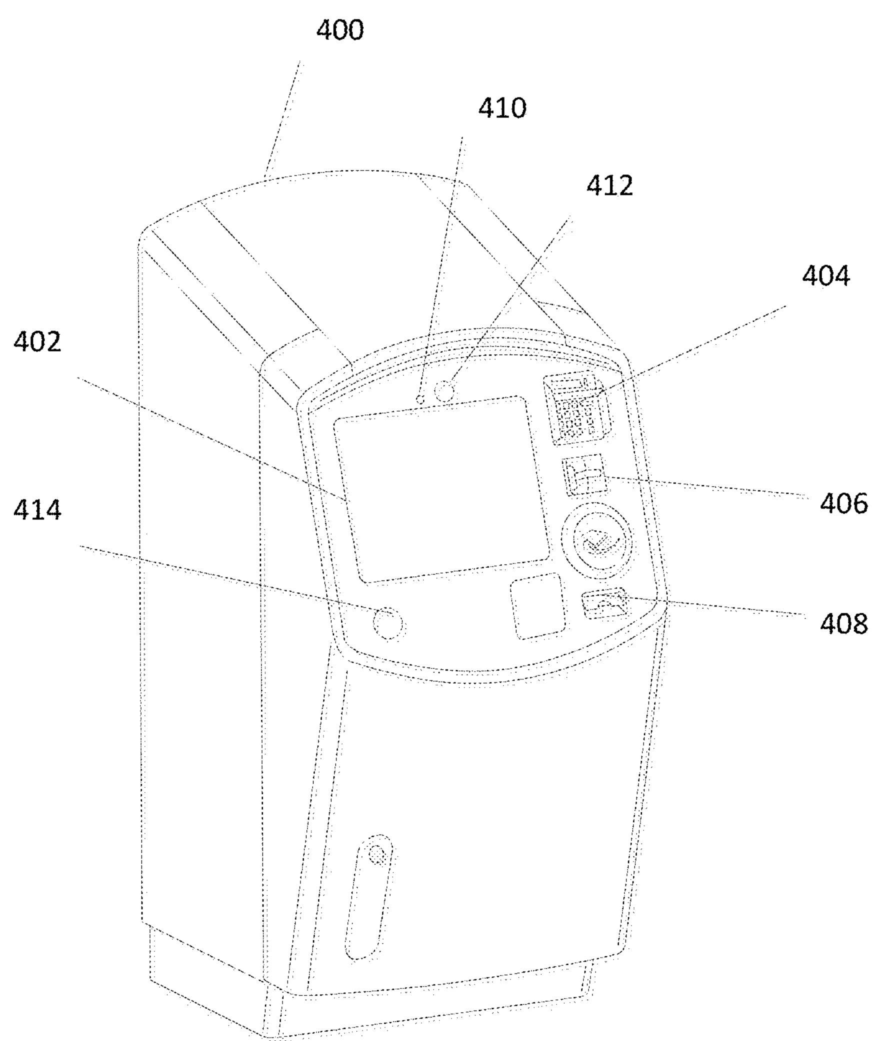
FIG. 4 is a depiction of a shared video vendor, according to one embodiment.

FIG. 4 depicts one embodiment of a vending machine for use in the systems and methods described herein. Vending machine 400 may include a display 402 that may provide information related to available remote sources, information related to products and/or services available from a selected remote source, details related to the transaction, and/or any other information. Vending machine 400 may also include an input interface 404. Input interface 404 may include a keypad, a touchscreen on display 402, a voice command device, and/or any other mechanisms for allowing a user to input information. A payment reader 406 may be included on vending machine 400. Payment reader 406 may include cash and/or coin readers, credit and/or debit card readers, bar code scanners, near field communication (NFC) devices, and/or any other device configured to read information stored on a payment medium. A printer 408 may be included to print transaction items such as entry tickets, boarding passes, confirmation tickets, vouchers, receipts, and/or any other documentation related to a transaction. In some embodiments, transaction items will be issued electronically, rather than a printed hard copy being provided. Vending machine 400 may also include a camera 410, a microphone 412, and/or a speaker 414 to enable audio and/or video communication with a selected source. Each of the components of the vending machine 400 may be controlled by the vending machine 400 locally, or remotely by the selected remote source using a control service as described herein.

Figure 5:
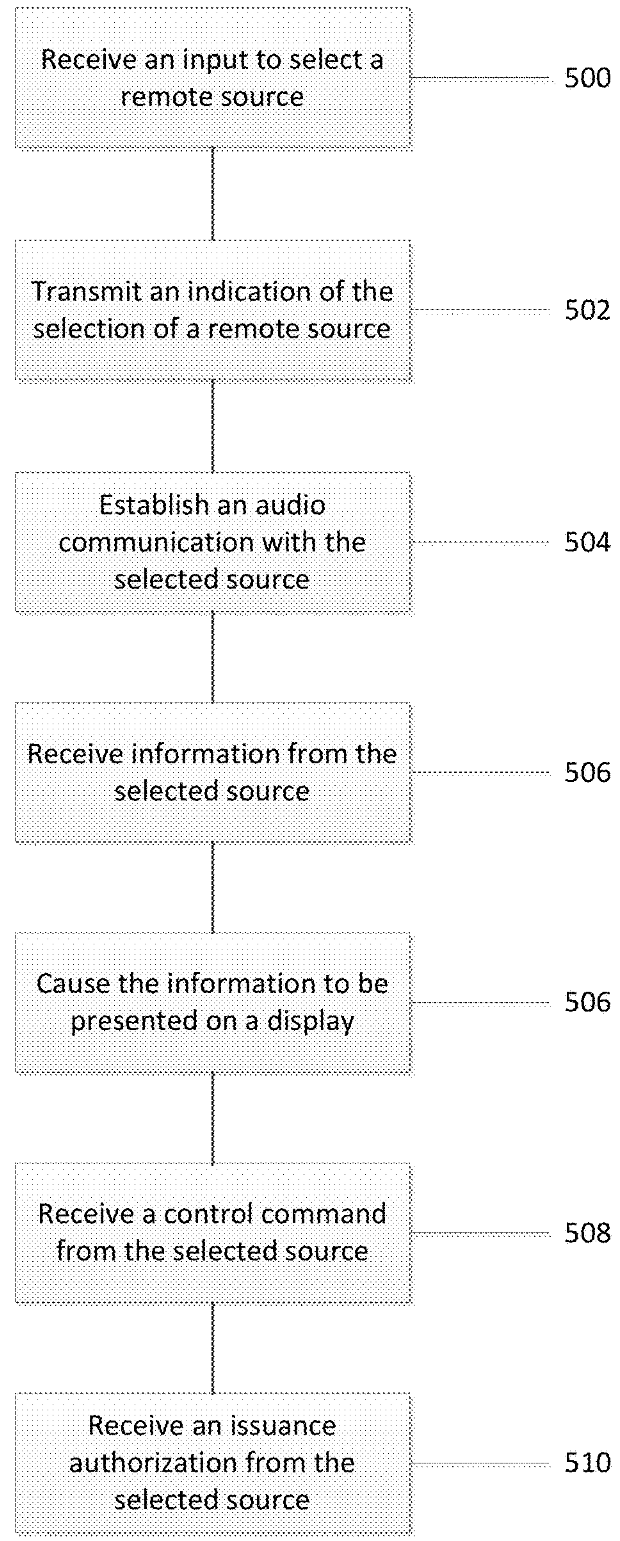
FIG. 5 is a flow diagram illustrating a process of distributing products from a vending machine from one of a number of remote sources, according to one embodiment.

FIG. 5 depicts a method for enabling a transaction between a user and one of a number of remote sources using a vending machine is provided. In some embodiments, the method may be performed by a vending machine. In other embodiments, the method may be performed on a server remotely located from the vending machine, such as a control service as described herein. The method may include receiving an input, via an input interface, to select one of the number of remote sources at block 500. Each remote source may be communicatively coupled with the vending machine via a communication interface or control service. The remote sources may include entertainment providers, transit providers, lodging providers, and any other retailers and providers of goods and/or services. The input may be in the form of a button press, verbal command, or by scanning an item indicative of a selected source, such as a bus pass. In some embodiments, transaction option from the remote sources may be presented on a display of the vending machine. An indication that one of the plurality of remote sources has been selected may be transmitted to the selected source using a communication interface at block 502. An audio communication with the selected remote source may be established using the communication interface at block 504. In some embodiments, a camera of the vending machine may be operated to include a video with the audio communication. At block 506, information related to the transaction with the selected source may be received from the selected source by the control service and/or vending machine. The method may also include causing the information to be presented on a display of the vending machine at block 508.

At block 510, a control command that directs a hardware peripheral of the vending machine to perform a function may be received from the selected source using the communication interface. For example, a command may direct information to be presented on a display, a ticket or receipt may be printed, or other hardware functions operated. In some embodiments, a payment may be received from a user. Some forms of payment, such as credit cards, require authorization from a financial institution. A payment authorization request associated with the payment may be communicated to a financial institution. An authorization approval related to the payment authorization request may be received. An indication that the payment has been accepted may be sent to the selected remote source. In some embodiments, a received payment may be provided to a payment reconciliation system that analyzes received payments information and expected payments from each of the remote sources to determine how collected revenue is to be distributed. A record of each transaction may be provided to the payment reconciliation system. An issuance authorization may be received from the selected remote source at block 512. The issuance authorization may cause a transaction item to be issued from the vending machine. The issuance of a transaction item may include printing the transaction item and/or by providing the transaction item electronically, such as via email or by writing a file to a mobile device and/or smartcard. In some embodiments, a request to print a receipt for the transaction using a printer of the vending machine may be received from the selected source. In some embodiments, an indication that the transaction has been completed may be provided after the audio communication has been terminated.

As one example, a SVV may be in an idle state. A customer may approach SVV and be shown multiple service center options on a touch screen display of the SVV—Rail Tickets, Theatre tickets, Hotel Bookings, and Flights. The customer may select 'Hotel Bookings.' A control service of the SVV may route the call via a call management service through to a hotel bookings call center. The interface system in the hotel bookings call center passes the SVV's address and authentication details to a hotel booking POS system. The hotel booking POS system takes control of the SVV device in the field using the control service. An agent from the hotel bookings call center may then discuss the hotel requirements with the customer. The agent uses the hotel booking POS system to identify a room and asks the customer to pay. The hotel booking POS system requests the SVV to take the required payment. The customer inserts their credit card into the SVV, and the payment is authenticated. The SVV takes the payment requested by the hotel booking POS system. The SVV reports to the hotel booking POS system that the payment has been taken.

The SVV generates a payment transaction for a reconciliation service. The agent confirms the booking with the hotel through the hotel booking POS system. The agent uses the hotel booking POS system to instruct the SVV to print a receipt that shows the booking details. The SVV prints a receipt for the customer that includes details of the hotel booking. The SVV generates a receipt-print transaction for the reconciliation service. The customer and agent end the call. The SVV generates a call log transaction for the reconciliation service and links it to the payment and receipt-print transactions. The SVV transmits all transactions to the reconciliation service's data store. The SVV returns to idle state. It will be understood that this use case is an example only. Other systems and configurations may be used. A person of ordinary skill in the art will recognize many variations exist.

The systems that enable multiple remote sources to control hardware features of a device may be used in many other applications. One such application is in billboards. Oftentimes, billboards are used for advertisements, for traffic and weather updates, and/or emergency messages such as from a police department. In some embodiments, each remote source, be it an advertiser and/or status update, may be able to control the content of a billboard. A control service may connect to the billboard and the remote sources such that a customized message may be displayed by one or more of the sources. In some embodiments, a priority system or queue may be set up to determine which remote source is provided access to the billboard. For example, a police department may be positioned at the top of a priority list such that the department may display emergency updates on the billboard at any time when necessary. Weather and traffic updates may be positioned in the middle of a list, and advertisers may be positioned at the bottom of the list. Other priority structures may be designed by the billboard owner/operator. In some embodiments, a priority list may be time dependent, such that advertisers may pay more for more valuable billboard time. For example, a major product manufacturer may be willing to pay a premium for a higher priority spot during rush hour, when the billboard is getting maximum exposure. A local company may be willing to pay more to get priority on the billboard during non-peak times. An indication may be sent by the control service to sources to indicate when the billboard is usable to them. The source may then communicate a message to be displayed on the billboard through the control service.

Figure 6:
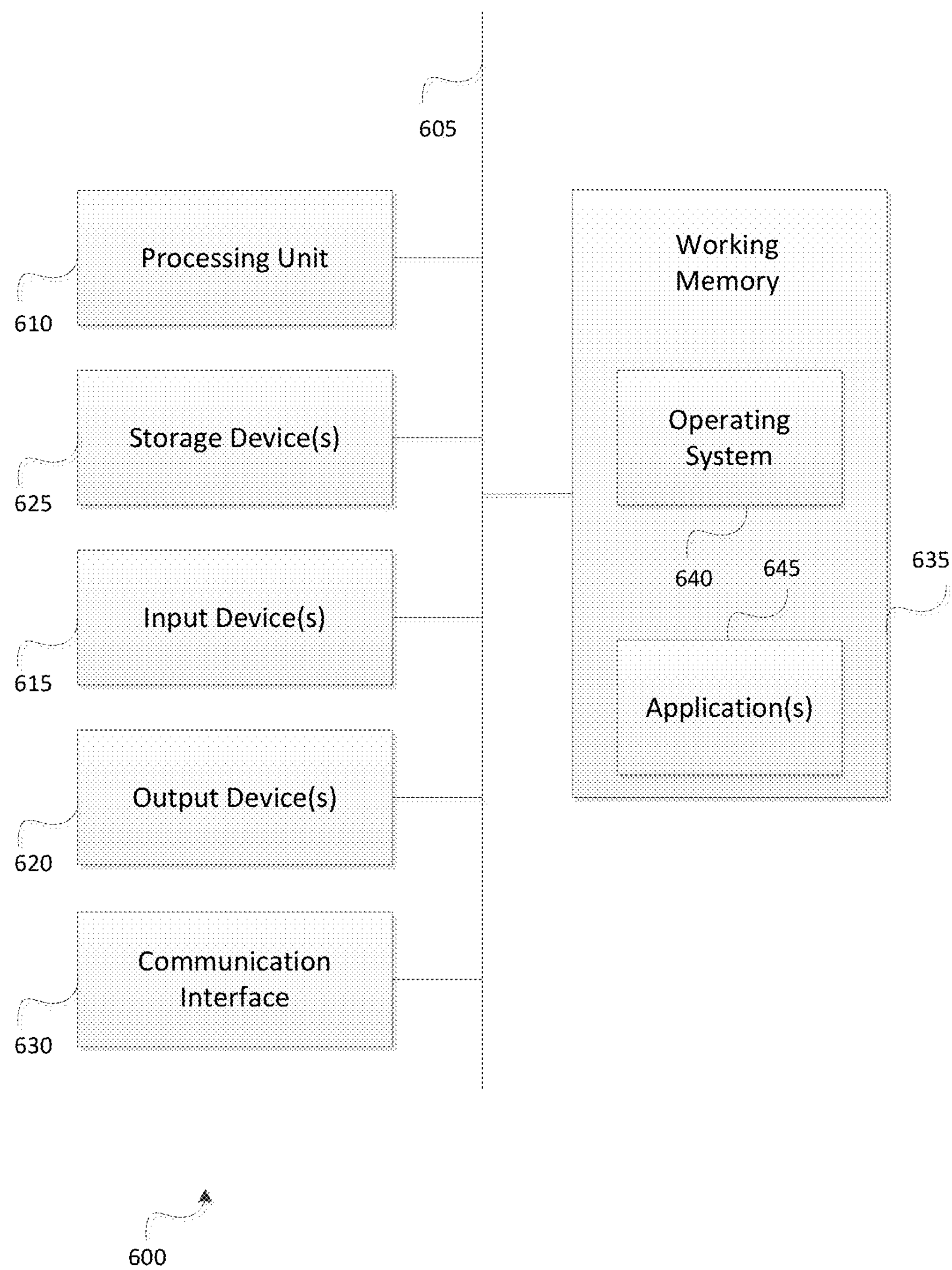
FIG. 6 is a block diagram of an example computing system.

A computer system as illustrated in FIG. 6 may be incorporated as part of the previously described computerized devices. For example, computer system 600 can represent at least some of the components of the vending machine 100, control service 102, interface system 104, and/or POS system 106 of FIG. 1. FIG. 6 provides a schematic illustration of one embodiment of a computer system 600 that can perform the methods provided by various other embodiments, as described herein, and/or can function as the host computer system, a remote kiosk/terminal, a point-of-sale device, a mobile device, and/or a computer system. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include a processing unit 610, including without limitation one or more general-purpose processors and/or one or more special-purpose processors (such as digital signal processing chips, graphics acceleration processors, and/or the like); one or more input devices 615, which can include without limitation a mouse, a keyboard, a touchscreen, a microphone, a camera, and/or the like; and one or more output devices 620, which can include without limitation a display device, a speaker, a printer, a fare media dispenser, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communication interface 630, which can include without limitation a modem, a network card (wireless or wired), an infrared communication device, a wireless communication device and/or chipset (such as a Bluetooth™ device, an 502.11 device, a WiFi device, a WiMax device, an NFC device, cellular communication facilities, etc.), and/or similar communication interfaces. The communication interface 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an journey planning and pricing engine configured to provide some or all of the features described herein relating to the journey planning and/or pricing can comprise hardware and/or software that is specialized (e.g., an application-specific integrated circuit (ASIC), a software method, etc.) or generic (e.g., processing unit 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processing unit 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processing unit 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processing unit 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communication interface 630 (and/or the media by which the communication interface 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a non-transitory storage device 625 either before or after execution by the processing unit 610.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A vending machine for enabling a transaction between a user and of one of a plurality of remote sources, the vending machine comprising:

a communication interface communicatively coupled with interface systems of each of the plurality of remote sources via a control service, wherein the control service includes an application programming interface (API) that allows each of the plurality of remote sources to communicate with and control the vending machine, wherein connections between the control service and each of the plurality remote sources are encrypted, wherein the vending machine and each of the plurality of remote sources are authenticated prior to being enabled to ensure that connections between the interface system and a corresponding one of each of the plurality remote sources is secure, and wherein the control service maintains an open connection with only the vending machine and the interface systems;

an input interface for receiving an input regarding the selection of one of a group of remote sources;

a speaker;

a microphone, wherein the speaker and the microphone are configured to enable an audio communication with the selected remote source;

a display for providing information from the selected remote source, wherein the information is related to the transaction with the selected remote source; and a processor that is configured to:

transmit an indication to the control service that one of the plurality of remote sources has been selected, wherein the control service relays the indication to the selected source via a corresponding interface system of the selected source;

establish, via the communication interface and the control service, the audio communication with the selected remote source, wherein establishing the audio communication causes a call management system to provide an additional indication to the control service regarding the selection of the one of the plurality of selected sources such that remote access of the vending machine is granted to the one of the plurality of selected sources using the control service;

upon transmission of the indication to the control service that the one of the plurality of selected sources has been selected, providing remote access of the vending machine to the one of the plurality of selected sources through the control service, wherein the remote access is provided by a virtual machine on a server located remotely from the vending machine;

receive from the selected source via the corresponding interface and the control system, in response to the audio communication with the selected source, information related to a product or a service offered for purchase by the selected source;

present on the display, the information related to the product or the service offered for purchase by the selected source;

receive, via the communication interface, a control command from the selected remote source via the corresponding interface system and the control system that directs a hardware peripheral of the vending machine to perform a function;

receive a payment at the vending machine for the purchase of a transaction item related to the product or service offered for purchase by the selected source;

transmit to the selected source via the control system and the corresponding interface system an indication that the payment has been received;

receive an issuance authorization from the selected remote source via the corresponding interface system and the control system, wherein the issuance authorization causes a transaction item related to the product or the service offered for purchase by the selected source to be issued;

transmit the received payment to a reconciliation system, wherein the reconciliation system is configured to distribute payments to each of the plurality of remote sources by analyzing received payments information and expected payments information from each of the plurality of remote sources to determine proper payment amounts for each of the plurality of remote sources; and transmit a transaction record associated with the issuance of the transaction item related to the product or service offered for purchase by the selected source to both a back office associated with the vending machine and the reconciliation system, wherein the reconciliation system is further configured to collect and compare transaction records for a plurality of transactions from the back office and each of the plurality of remote sources to detect any possible discrepancies within the transaction records.

2. The vending machine for distributing products from remote sources of claim 1, further comprising:

a camera configured to enable a video communication with the selected remote source.

3. The vending machine for distributing products from remote sources of claim 1, further comprising:

a reader that is configured to read information stored on a payment medium.

4. The vending machine for distributing products from remote sources of claim 1, wherein the computer processor is further configured to:

receive a payment from the user;

communicate a payment authorization request associated with the payment to a financial institution;

receive an authorization approval related to the payment authorization request; and send an indication that the payment has been accepted to the selected remote source.

5. The vending machine for distributing products from remote sources of claim 1, further comprising:

a printer configured to print one or more of a ticket or a receipt.

6. The vending machine for distributing products from remote sources of claim 1, wherein:

the input interface comprises a touchscreen of the display.

7. A method for enabling a transaction between a user and of one of a plurality of remote sources using a vending machine, the method comprising:

receiving an input, via an input interface, to select one of a plurality of remote sources, wherein each of the plurality of remote sources is communicatively coupled with the vending machine via a communication interface of the vending machine, wherein each of the plurality of remote sources comprises an interface systems that is in communication with the communication interface via a control service, wherein the control service includes an application programming interface (API) that allows each of the plurality of remote sources to communicate with and control the vending machine, wherein connections between the control service and each of the plurality remote sources are encrypted, wherein the vending machine and each of the plurality of remote sources are authenticated prior to being enabled to ensure that connections between the interface system and a corresponding one of each of the plurality remote sources is secure, and wherein the control service maintains an open connection with only the vending machine and the interface systems;

transmitting an indication to the control service that one of the plurality of remote sources has been selected, wherein the control service relays the indication to the selected source via a corresponding interface system of the selected source;

establishing, via the communication interface and the control service, an audio communication with the selected remote source, wherein establishing the audio communication causes a call management system to provide an additional indication to the control service regarding the selection of the one of the plurality of selected sources such that remote access of the vending machine is granted to the one of the plurality of selected sources using the control service;

upon transmission of the indication to the control service that the one of the plurality of selected sources has been selected, providing remote access of the vending machine to the one of the plurality of selected sources through the control service, wherein the remote access is provided by a virtual machine on a server located remotely from the vending machine;

receiving information from the selected source via the corresponding interface system and the control system, in response to the audio communication with the selected source, information related to a product or a service offered for purchase by the selected source;

causing the information related to the product or the service offered for purchase by the selected source to be presented on a display of the vending machine;

receiving, via the communication interface, a control command from the selected remote source via the corresponding interface system and the control system that directs a hardware peripheral of the vending machine to perform a function;

receiving a payment at the vending machine for the purchase of a transaction item related to the product or service offered for purchase by the selected source;

transmitting to the selected source via the control system and the corresponding interface system an indication that the payment has been received;

receiving an issuance authorization from the selected remote source via the corresponding interface system and the control system, wherein the issuance authorization causes a transaction item related to the product or the service offered for purchase by the selected source to be issued;

transmitting the received payment to a reconciliation system, wherein the reconciliation system is configured to distribute payments to each of the plurality of remote sources by analyzing received payments information and expected payments information from each of the plurality of remote sources to determine proper payment amounts for each of the plurality of remote sources; and transmitting a transaction record associated with the issuance of the transaction item related to the product or service offered for purchase by the selected source to both a back office associated with the vending machine and the reconciliation system, wherein the reconciliation system is further configured to collect and compare transaction records for a plurality of transactions from the back office and each of the plurality of remote sources to detect any possible discrepancies within the transaction records.

8. The method for distributing products from remote sources using a vending machine of claim 7, further comprising:

presenting transaction options from the plurality of remote sources on the display, wherein the plurality of remote sources are selected from a group consisting of entertainment providers, transit providers, and lodging providers.

9. The method for distributing products from remote sources using a vending machine of claim 7, further comprising:

establishing a video communication with the selected remote source using a camera of the vending machine.

10. The method for distributing products from remote sources using a vending machine of claim 7, further comprising:

receiving a request from the selected remote source to print a receipt using a printer of the vending machine.

11. The method for distributing products from remote sources using a vending machine of claim 7, further comprising:

providing an indication that the transaction is completed after the audio communication is terminated.

12. The method for distributing products from remote sources using a vending machine of claim 7, further comprising:

receiving a payment;

communicating a payment authorization request associated with the payment to a financial institution;

receiving an authorization approval related to the payment authorization request; and sending an indication that the payment has been accepted to the selected remote source.

13. The method for distributing products from remote sources using a vending machine of claim 7, further comprising:

providing a received payment to a payment reconciliation system that analyzes received payment information and expected payments from each of the remote sources to determine how collected revenue is distributed; and providing a record of the transaction to the payment reconciliation system.

14. The method for distributing products from remote sources using a vending machine of claim 7, wherein:

the method is performed on a server remotely located from the vending machine.

15. A computer program embodied on a computer readable medium, the computer program comprising instructions executable by a computer to:

receive a user input, via an input interface, to select one of a plurality of remote sources, wherein each of the plurality of remote sources is communicatively coupled with the vending machine via a communication interface of the vending machine, wherein each of the plurality of remote sources comprises an interface systems that is in communication with the communication interface via a control service, wherein the control service includes an application programming interface (API) that allows each of the plurality of remote sources to communicate with and control the vending machine, wherein connections between the control service and each of the plurality remote sources are encrypted, wherein the vending machine and each of the plurality of remote sources are authenticated prior to being enabled to ensure that connections between the interface system and a corresponding one of each of the plurality remote sources is secure, and wherein the control service maintains an open connection with only the vending machine and the interface systems;

transmit an indication to the control service that one of the plurality of remote sources has been selected, wherein the control service relays the indication to the selected source via a corresponding interface system of the selected source;

establish, via the communication interface and the control service, an audio communication with the selected remote source, wherein establishing the audio communication causes a call management system to provide an additional indication to the control service regarding the selection of the one of the plurality of selected sources such that remote access of the vending machine is granted to the one of the plurality of selected sources using the control service;

upon transmission of the indication to the control service that the one of the plurality of selected sources has been selected, provide remote access of the vending machine to the one of the plurality of selected sources through the control service, wherein the remote access is provided by a virtual machine on a server located remotely from the vending machine;

receive from the selected source via the corresponding interface system and the control system, in response to the audio communication with the selected source, information related to a product or a service offered for purchase by the selected source;

cause the information related to the product or the service offered for purchase by the selected source to be presented on a display of the vending machine;

receive, via the communication interface, a control command from the selected remote source via the corresponding interface system and the control system that directs a hardware peripheral of the vending machine to perform a function;

receive a payment at the vending machine for the purchase of a transaction item related to the product or service offered for purchase by the selected source;

transmit to the selected source via the control system and the corresponding interface system an indication that the payment has been received;

receive an issuance authorization from the selected remote source via the corresponding interface system and the control system, wherein the issuance authorization causes a transaction item related to the product or the service offered for purchase by the selected source to be issued;

transmit the received payment to a reconciliation system, wherein the reconciliation system is configured to distribute payments to each of the plurality of remote sources by analyzing received payments information and expected payments information from each of the plurality of remote sources to determine proper payment amounts for each of the plurality of remote sources; and transmit a transaction record associated with the issuance of the transaction item related to the product or service offered for purchase by the selected source to both a back office associated with the vending machine and the reconciliation system, wherein the reconciliation system is further configured to collect and compare transaction records for a plurality of transactions from the back office and each of the plurality of remote sources to detect any possible discrepancies within the transaction records.

16. The computer program embodied on a computer readable medium of claim 15, wherein the computer program further comprises instructions executable by a computer to:

present transaction options from the plurality of remote sources on the display, wherein the plurality of remote sources are selected from a group consisting of entertainment providers, transit providers, and lodging providers.

17. The computer program embodied on a computer readable medium of claim 15, wherein the computer program further comprises instructions executable by a computer to:

establish a video communication with the selected remote source using a camera of the vending machine.

18. The computer program embodied on a computer readable medium of claim 15, wherein the computer program further comprises instructions executable by a computer to:

provide an indication that the transaction is completed after the audio communication is terminated.

19. The computer program embodied on a computer readable medium of claim 15, wherein the computer program further comprises instructions executable by a computer to:

receive a request from the selected remote source to print a receipt using a printer of the vending machine.

20. The computer program embodied on a computer readable medium of claim 15, wherein the computer program further comprises instructions executable by a computer to:

provide a received payment to a payment reconciliation system that analyzes received payment information and expected payments from each of the remote sources to determine how collected revenue is distributed; and provide a record of the transaction to the payment reconciliation system.

* * * * *